United States Patent
Nishikawa et al.

(10) Patent No.: US 7,305,220 B2
(45) Date of Patent: Dec. 4, 2007

(54) RADIO RECEIVER WITH DIVERSITY RECEIVING FUNCTION

(75) Inventors: Takurou Nishikawa, Yokohama (JP);
Hirotoshi Shimizu, Yokohama (JP);
Takashi Dateki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 523 days.

(21) Appl. No.: 11/057,972

(22) Filed: Feb. 15, 2005

(65) Prior Publication Data
US 2005/0157825 A1   Jul. 21, 2005

(51) Int. Cl.
*H04B 1/06* (2006.01)
*H04M 1/00* (2006.01)

(52) U.S. Cl. .............. 455/272; 455/550.1; 455/575.7

(58) Field of Classification Search ............. 455/561, 455/562.1, 550.1, 575.7, 130, 132, 133, 134, 455/135, 574, 272, 273
See application file for complete search history.

(56) References Cited

U.S. PATENT DOCUMENTS

| | | | | |
|---|---|---|---|---|
| 5,103,459 A | * | 4/1992 | Gilhousen et al. | 370/206 |
| 5,461,646 A | * | 10/1995 | Anvari | 375/347 |
| 5,621,770 A | * | 4/1997 | Zastera | 375/347 |
| 6,014,570 A | * | 1/2000 | Wong et al. | 455/500 |
| 6,122,330 A | * | 9/2000 | Motohashi | 375/335 |
| 6,172,970 B1 | * | 1/2001 | Ling et al. | 370/347 |
| 6,618,429 B2 | * | 9/2003 | Gilhousen et al. | 375/141 |
| 6,647,015 B2 | * | 11/2003 | Malkemes et al. | 370/401 |
| 6,901,105 B1 | * | 5/2005 | Razzell | 375/148 |

FOREIGN PATENT DOCUMENTS

JP    6-037685    2/1994

* cited by examiner

*Primary Examiner*—Sonny Trinh
(74) *Attorney, Agent, or Firm*—Katten Muchin Rosenman LLP (57) ABSTRACT

A radio receiver includes a first sampling section and a second sampling section for sampling, in the predetermined sampling interval, a first receiving symbol and a second receiving symbol transmitted to the radio receiver via a first transmission route and a second transmission route, respectively. The radio receiver further includes a diversity combining section for diversity combining sampling signals obtained by the respective sampling, sections and a control section for controlling a sampling position to obtain the difference between the sampling position of the first receiving symbol sampled by the first sampling section and the sampling position of the second receiving symbol sampled by the second sampling section such that the obtained difference is different from the difference in the sampling positions corresponding to the difference in timing between the first receiving symbol and the second receiving symbol.

9 Claims, 10 Drawing Sheets

RADIO RECEIVER WITH DIVERSITY RECEIVING FUNCTION

BACKGROUND OF THE INVENTION

1. Field of the Invention

The present invention relates to a radio receiver and more specifically to a radio receiver having the diversity receiving function.

2. Description of the Related Art

In the current radio communication technology, various communication systems such as time division communication system, code division communication system have been introduced. These communication systems have a radio transmitter and a radio receiver as illustrated in FIG. 1.

Figure 1:
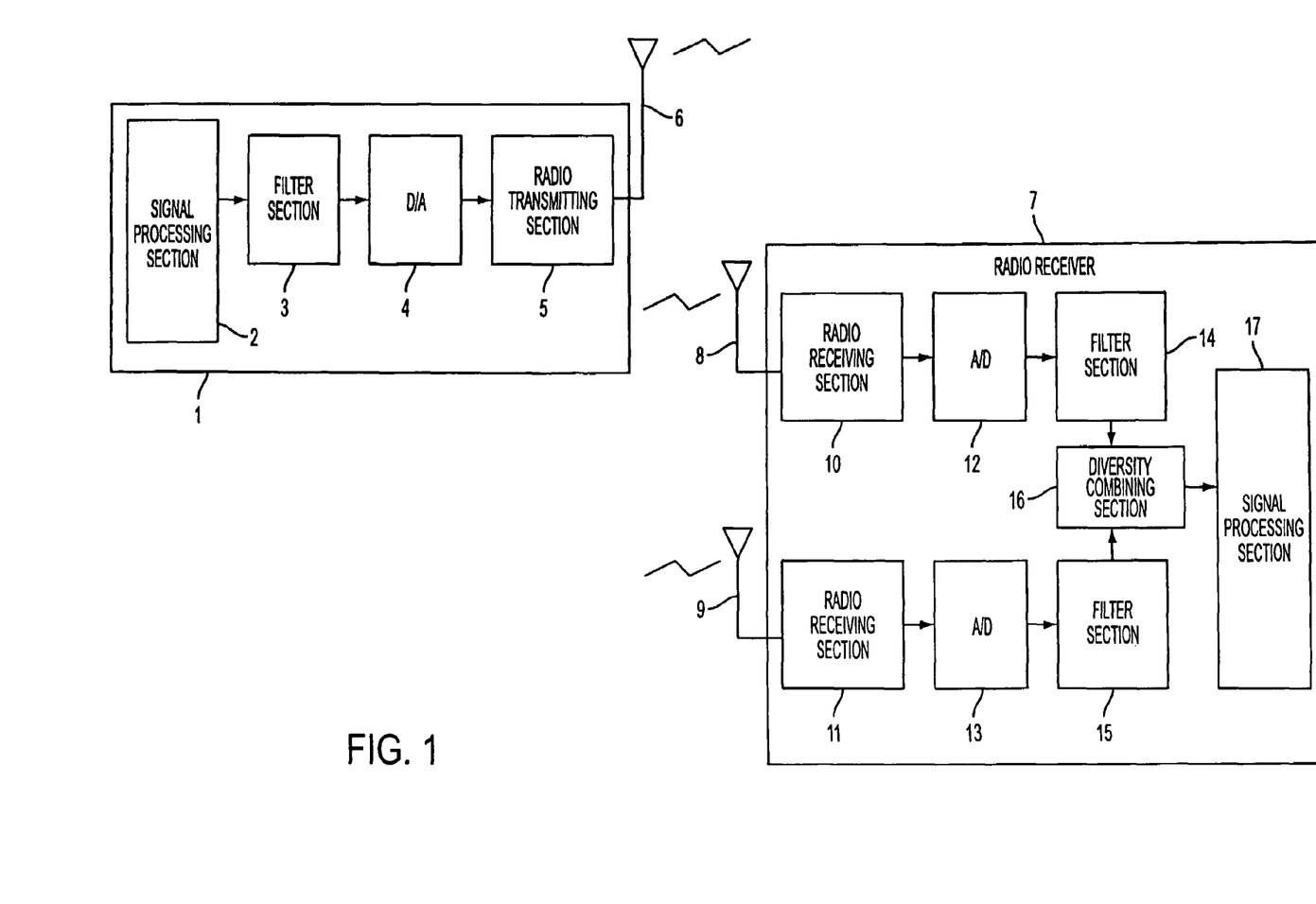
FIG. 1 diagrammatically shows a conventional radio transmitter and a conventional radio receiver.

In FIG. 1, reference numeral 1 designates a radio transmitter, while 7 designates a radio receiver. The radio receiver i comprises a signal processing section 2, a filter section 3, a D/A converter 4, a radio signal transmitting section 5, and an antenna 6. Meanwhile, the radio receiver 7 comprises two different antennas 8, 9 for diversity reception, radio signal receiving sections 10, 11, A/D converters 12, 13 corresponding to the respective antennas, filter sections 14, 15 corresponding to the respective antennas, a diversity combining section 16 for diversity combining outputs of the filter sections 14, 15 and a signal processing section 17 for processing the combined signal.

Next, operations of respective sections for transmitting a radio signal to the radio receiver 7 from the radio transmitter 1 will be briefly described. First, in the radio transmitter 1, the transmitting data to be transmitted from the signal processing section 2 is outputted as a digital signal and is then inputted to the filter section 3. As the filter section 3, a route Nyquist filter, for example, can be used. The filter section 3 suppresses inter-symbol interference of the input signal. An output signal from the filter section 3 is inputted then to the D/A converter 4, converted to the analog signal, and inputted to the radio transmitting section 5. The signal outputted from the signal processing section 2 and inputted to the radio transmitting section 5 is usually called a baseband signal.

The radio transmitting section 5 performs modulation process conforming to the predetermined modulation method (for example, orthogonal modulation or the like) on the basis of the input analog baseband signal and moreover transmits the radio signal from the antenna 6 after frequency conversion of the modulated signal to the radio frequency signal. When the radio transmitter 1 corresponds to the communication system of the code division system, the spread signal by the spread code is outputted from the signal processing section 2.

The radio signal transmitted from the radio transmitter 1 is received by two antennas 8, 9 installed at the radio receiver 7. Usually, these antennas are provided as the separated antennas for diversity reception. Accordingly, similar radio signals transmitted from the radio antenna 6 are respectively received with the antennas 8, 9 through different transmission routes.

The signals received by the antennas 8, 9 are demodulated in the radio signal receiving sections 10, 11 depending on the modulation method in the radio signal transmitting section 5 of the radio transmitter 1. Therefore, the baseband signals as the analog signal obtained by demodulation are outputted to the A/D converters 12, 13, respectively. When radio transmitter 1 introduces the orthogonal modulation method, the radio receiver 7 performs the orthogonal detection and provides the so-called parallel outputs of the I and Q elements. However, the parallel output is illustrated as a single output of transmitter 1 to simplify the description (radio receiving section 10 to signal processing section 17, radio receiving section 11 to signal processing section 17).

The A/D converters 12, 13 convert the received analog signal to the digital signal and then output the digital signal to the filter sections 14, 15, respectively.

As each of the filter sections 14, 15, a route Nyquist filter or the like is used as in the case of the radio transmitter 1 and applies the digital signal suppressing the inter-symbol interference to the diversity combinig section 16. The signal receiving system up to the diversity combining section 16 from the side of antenna 8 is called a first signal receiving system, while the signal receiving system up to the diversity combining section 16 from the side of antenna 9 is called a second signal receiving system, for discrimination of the signal receiving systems.

The diversity combining section 16 combines (for example, by addition) the received digital signals obtained through the first and second signal receiving systems and then applies the signal having suppressed noise through the diversity gain to the signal processing section 17.

The signal processing section 17 extracts a control signal and an information signal or the like included in the input signal to provide the output depending on the information signal to an output section (not illustrated) or to control each section in the radio receiver 7 with reference to the control signal.

The Japanese Published Unexamined Patent Application No. 1994-37685 (JP) discloses a general constitution of the diversity receiving apparatus.

A radio receiver provided with the ordinary diversity receiving function has the elements as described above and operates on the basis of such elements.

However, the above described conventional radio receiver has the following problems.

The radio signal receiving sections 10, 11 of the radio receiver 7 outputs, to the A/D converter, the signal having completed receiving processes such as suppression of the signal not in the specified frequency band with a filter such as BPF, frequency conversion, orthogonal detection or the like and the A/D converters 12, 13 respectively convert the analog signal of the radio signal receiving sections 10, 11 into the digital signal. Here, the A/D converters 12, 13 sample, for conversion into the digital signal, the analog signal with reference to the same timing using an output signal from a common oscillator (not shown in FIG. 1). Here, as the sampling frequency, the frequency, for example, which is higher by two or more times than the signal bandwidth of the baseband signal applied from the radio signal receiving section 10, is used.

Figure 2:
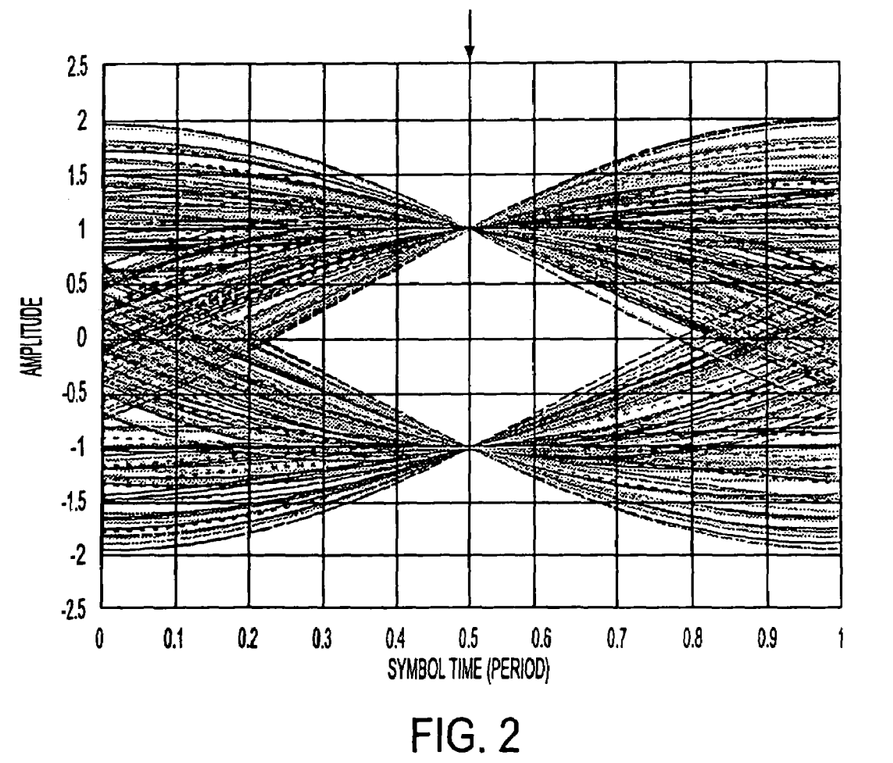
FIG. 2 is a diagram illustrating an ordinary eye pattern.

As the optimum timing for the sampling, the Nyquist point receiving less amount of influence of other codes (time corresponding to 0.5 symbol in FIG. 2, namely the point indicated with an arrow mark) may be suggested. However, when it is assumed that the frequency which is equal to two times the signal bandwidth is used as the sampling frequency, the ideal A/D conversion can be realized when the sampling timing matches the Nyquist point. However, if the sampling timing is deviated from the Nyquist point, the signal is intensively influenced by inter-symbol interference and thereby a signal to noise ratio of the received signal is deteriorated to a large extent. Here, one symbol is the signal corresponding to one modulation period and also to one data (for example, the data "0" or "1") when the modulation is performed with one data period. In this case, when the data is spread with the spread code and modulation is performed within the period corresponding to one chip after the spread, one symbol corresponds to the signal corresponding to one chip.

As a measure for improving quality of the received signal deteriorated due to deviation of such sampling timing, it is possible to perform the sampling with the timing nearer to the timing of the Nyquist point by realizing the oversampling with the sampling frequency which is higher by two or more times than the signal bandwidth. However, it is generally known that as the sampling frequency is further raised, the circuit configuration of the radio receiver becomes more complicated and power consumption is increased, making it more difficult to realize reduction in size of the radio receiver and lower power consumption by the radio receiver.

Moreover, particularly when the QAM system of 16-level is introduced and the code division system allowing higher multiplexing degree of codes is employed as a radio receiver or when a radio receiver having only the simplified error correction capability is used, a significant problem of such sampling timing in the radio receiver occurs and thereby deterioration in quality of a receiving signal resulting from the deterioration in the signal-to-noise ratio is extremely increased.

SUMMARY OF THE INVENTION

Accordingly, the major object of the present invention is to realize the optime sampling timing in a radio receiver, particularly a radio receiver having the diversity receiving function to achieve considerable reduction in size and/or lower power consumption in the radio receiver. The configuration of the radio receiver and its effects which are disclosed in the following description could not be realized in the prior art.

(1) According to the present invention introduces a radio receiver a first sampling section for sampling, in the predetermined sampling interval, a first receiving symbol obtained by receiving a first transmitting symbol transmitted via a first transmission route, a second, sampling section for sampling, in the sampling interval similar to the predetermined sampling interval, a second receiving symbol obtained by receiving the first transmitting symbol transmitted via a second transmission route, a diversity combining section for diversity combining each sampling signal obtained by said first sampling section and said second sampling section, respectively and a control section for controlling a sampling position to a difference between the sampling position of the first receiving symbol sampled by the first sampling section and the corresponding sampling position of the second receiving symbol sampled by the second sampling section, which is different from the difference in sampling positions corresponding to the difference in a time between the time of receiving the first receiving symbol and the time of receiving of the second receiving symbol.

Here, the first transmission route and the second transmission route only limit the difference in the transmission route but receiving antennas may be different or same. Moreover, the diversity combining is the concept including the combining by addition and combining by selection.

(2) Moreover, the present invention employs a radio receiver for the diversity reception using signals of the two signal receiving systems received by two antennas respectively. The first signal receiving system of the radio receiver is coupled to one antenna and the second signal receiving system of the radio receiver is coupled to another antenna.

The radio receiver comprises a first sampling section for sampling a received signal of a first signal receiving system, a second sampling section for sampling a received signal of a second signal receiving system, a diversity combining section for diversity combining signals sampled by the first sampling section and the second sampling section, a timing generating section for generating a sampling timing, and a timing control section for controlling at least one of a first sampling timing for said first sampling section and a second sampling timing for said second sampling section to cause a specified amount of deviation between said first sampling timing and said second sampling timing.

(3) Moreover, in the radio receiver described in the item (2), the specified amount of deviation may be larger than zero (0) but equal to or smaller than a half of the interval of sampling timing.

(4) The radio receiver described in item (2), further comprising a control section for pre setting the specified amount of deviation to a predetermined value which is equal to or smaller than a half of the sampling timing and changing a preset specified amount preset by the control section to approximate the sampling timing of the other sampling section to the sampling timing of the sampling section corresponding to the system at the high quality side on the basis of the quality of the received signal of the first signal receiving system after the sampling by the first sampling section after the presetting and the quality of the received signal of the signal receiving second system after the sampling by the second sampling section.

(5) In the radio receiver described in item (4), the control section sets again the specified amount of deviation to the preset value on the basis of the quality of the received signal of the first signal receiving system after the sampling by the first sampling section after the change in the preset amount and the quality of the received signal of the second signal receiving system after the sampling by the second sampling section after the setting when both qualities are deteriorated exceeding a-reference value.

(6) Moreover, the radio receiver described in the item (2), further comprises an evaluating section using a selecting/diversity combining section as the diversity combining section in order to evaluate the quality of the received signal of the first signal receiving system after the sampling by the first sampling section and the quality of the received signal of the second signal receiving system after the sampling by the second sampling section, wherein a selected signal is applied to the selecting/diversity combining section from the evaluating section to select the signal of the signal receiving system having higher signal receiving quality evaluated by the evaluating section.

DETAILED DESCRIPTION OF THE PREFERRED EMBODIMENTS

The preferred embodiments of the present invention will be described below.

First Embodiment (Description of Configuration)

Figure 3:
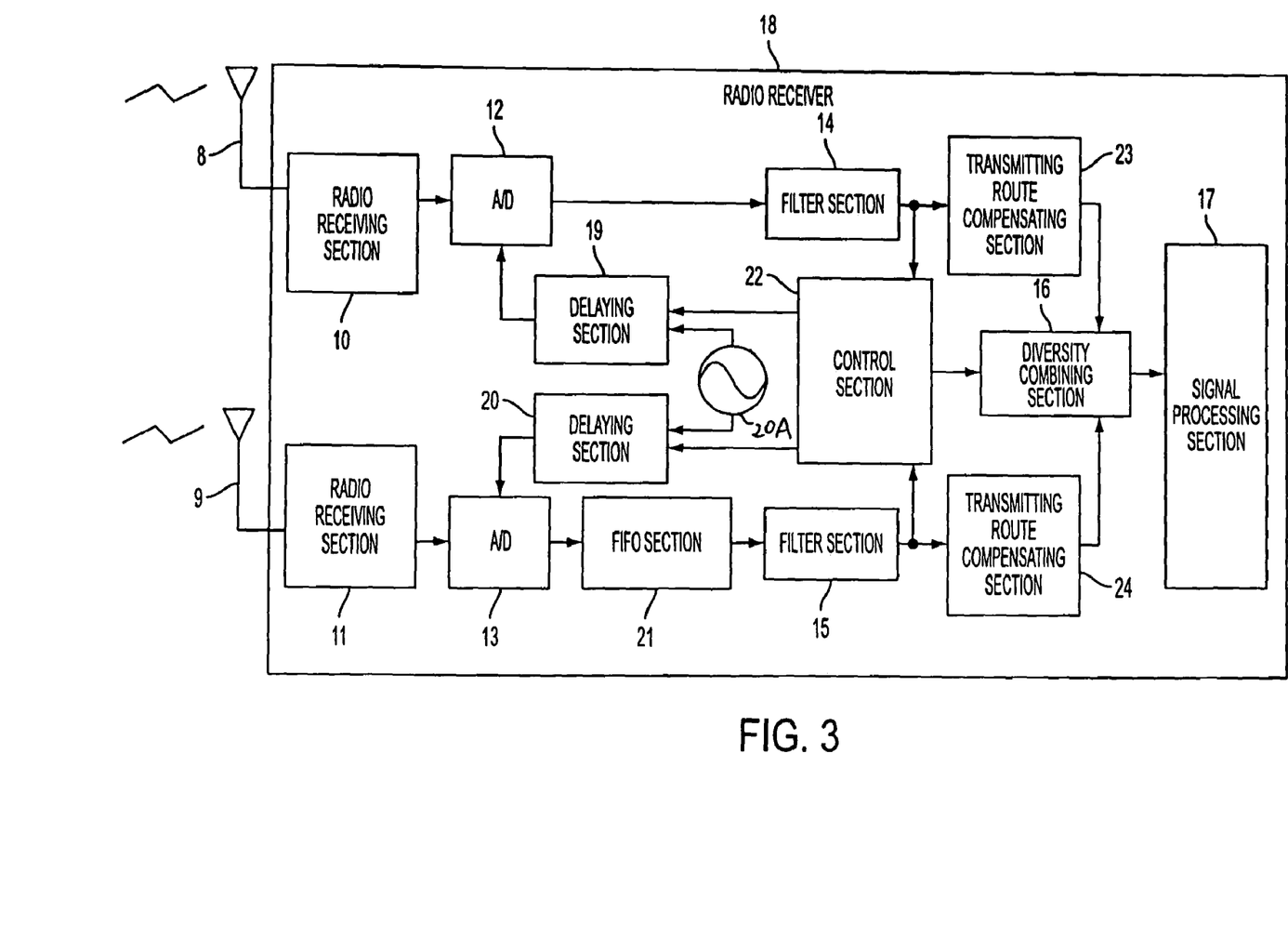
FIG. 3 diagrammatically shows a radio receiver of the first embodiment of the present invention.

FIG. 3 is a diagram illustrating an example of the configuration of the radio receiver of the present invention. It is to be noted that the same reference numerals are used for the same elements in all figures of the drawings. The radio receiver of FIG. 3 is provided with two antennas 8 and 9 for the diversity reception but these two antennas can also be integrated into one antenna. For example, in the case where the radio signals in the frequencies F1, F2 obtained through the modulation with the same transmission symbol are transmitted from the radio receiver, it is also possible that the received symbols obtained in correspondence with respective frequencies of the received signal are processed as the first receiving symbol and the second receiving symbol.

In FIG. 3, reference numeral 18 designates a radio receiver of the first embodiment of the present invention. Numerals 8, 9 designate two different antennas for diversity reception. Numerals 10, 11 designate radio signal receiving sections provided respectively for two antennas to perform the receiving processes such as the orthogonal detection. Numerals 12, 13 designate A/D converters which are designed to perform the over-sampling of two times. Numerals 14, 15 designate filter sections for suppressing inter-symbol interference such as route Nyquist filters. Numeral 16 designates a diversity combining section for diversity combining. Numeral 17 designates a signal processing section for executing the signal processing using the received signal after the diversity combining.

Moreover, in this embodiment, delaying sections 19, 20 are connected to the respective A/D converters to provide a certain delay to the signal outputted from an oscillator 20A. Moreover, the FIFO section (buffer for the first-in first-out process) 21 is connected between A/D converter 13 and filter section 15. This FIFO section realizes matching of output timing deviations of the, sampling value including the processing times in the first signal receiving system and second signal receiving system. In addition, a control section 22 is also provided for evaluating the quality of the received signal. Transmission route compensating sections 23, 24 are connected to respective filter sections 14, 15 and to the diversity combinig section 16.

(Description of Operations)

Next, operations of the radio receiver 18 of FIG. 3 will be described in case that the radio transmitter 1 shown in FIG. 1 and described previously transmits the radio signal to the radio receiver 18.

The radio signal transmitted, as described above, from the radio transmitter 1 is received by two antennas 8, 9 connected to the radio receiver 18. Usually, these antennas are provided separately for the diversity reception. Accordingly, the radio signal transmitted from the radio antenna 6 of the transmitter 1 is respectively received by antennas 8, 9 via two different transmission routes or paths.

The signals received by the antennas 8, 9 are subjected to the decoding processes in the radio signal receiving sections 10, 11, depending on the modulation system of the radio transmitting section 5 of the radio transmitter 1. The baseband signals obtained through demodulation are then outputted to the A/D converters 12, 13.

The A/D converter 12 converts the input analog signal and outputs the digital signal using the timing given from the delaying section 19 as the sampling timing. However, the delaying section 19, which is set with the amount of delay by the control section 22, delays an output signal from the oscillator 20A depending on the preset amount of delay and applies the delayed output signal to the A/D converter 12.

The A/D converter 13 also converts the input analog signal and outputs the digital signal using the timing given from the delaying section 20 as the sampling timing. However, the delaying section 20, which is also set with the amount of delay by the control section 22, delays an output signal from the oscillator 20A depending on the preset amount of delay and applies the delayed output signal to the A/D converter 13.

The digital signal as an output signal from the A/D converter 12 is suppressed in the inter-symbol interference, like the radio transmitter 1, by filter section 14 which can be the route Nyquist filter and is then inputted to the control section 22 and to transmission route compensating section 23.

Meanwhile, the digital signal as an output signal of the A/D converter 13 is once stored in the FIFO section 21, outputted therefrom in the input sequence and is applied to the filter section 15. This FIFO section realizes reduction (preferably, matching of timing) of output timing deviation of the sampling value including the processing periods of the first and second signal receiving systems.

The filter section 15 executes the process to suppress inter-symbol interference to the input signal and then applies the signal to the control section 22 and transmission route compensating section 24.

The control section 22 obtains a signal to interference ratio (SIR) of each digital received signal using the received digital signals from the filter sections 14, 15 and sets the amount of delay to the delaying sections 19, 20 depending on the obtained SIR. The control section 22 also has the function to preset the amount of delay to the delaying sections 19, 20 before calculation of the SIR value. Detailed control operation of the control section 22 will be described below.

The other outputs of the filter sections 14, 15 are subjected to the phase rotating process by the transmission route compensating sections 23, 24. Namely, the transmission route compensating sections 23, 24 execute the phase rotating process to the received signal to compensate for phase rotation of the received signal in the transmission route using the known signal (pilot signal or the like) included in the received signal.

The diversity combining section 16 combines the signals after the transmission route compensation and applies the combined signal to the signal processing section 17. The diversity combinig section 16 can obtain the noise reduction effect by only adding and outputting the outputs of the transmission route compensating sections 23, 24 but more preferably applies the signal after the so-called selective combining to the signal processing section 17 by receiving the information on the signal receiving system having higher quality for the received signal of each signal receiving system from the control section 22 (for example, receiving the signal "0" when the received signal from antenna 8 has higher quality or the signal "1" when the received signal from the antenna 9 has higher quality) and then performing the selective combining for selecting and outputting the received signal having higher quality depending on the signal received by the antennas. Here, the timing for the selection switching to execute the selective combining can be set in unit of a single symbol or a plurality of symbols. When the selection is switched in unit of a plurality of symbols, it is possible to obtain the effect that influence of the fluctuation in the calculated value of SIR can be lowered because the accumulation process can be executed for a plurality of symbols for evaluation of SIR.

The signal processing section 17 extracts the control signal and information signal or the like included in the input signal in order to provide an audio output or a display output to a display output section (not illustrated) depending on the information signal or to control each section of the radio receiver with reference to the control signal. For example, control for increase and decrease of the transmitting power is performed to the radio transmitting section of radio receiver 18 (not illustrated) when the signal for instructing increase or decrease of transmitting power with the control signal is included in the case where the radio receiver 18 also has the transmitting function.

(In Regard to the Sampling Timing)

Next, operations of A/D converters 12, 13 in which attention is paid particularly to the sampling timing in the radio receiver of this embodiment will be described in detail.

Figure 4:
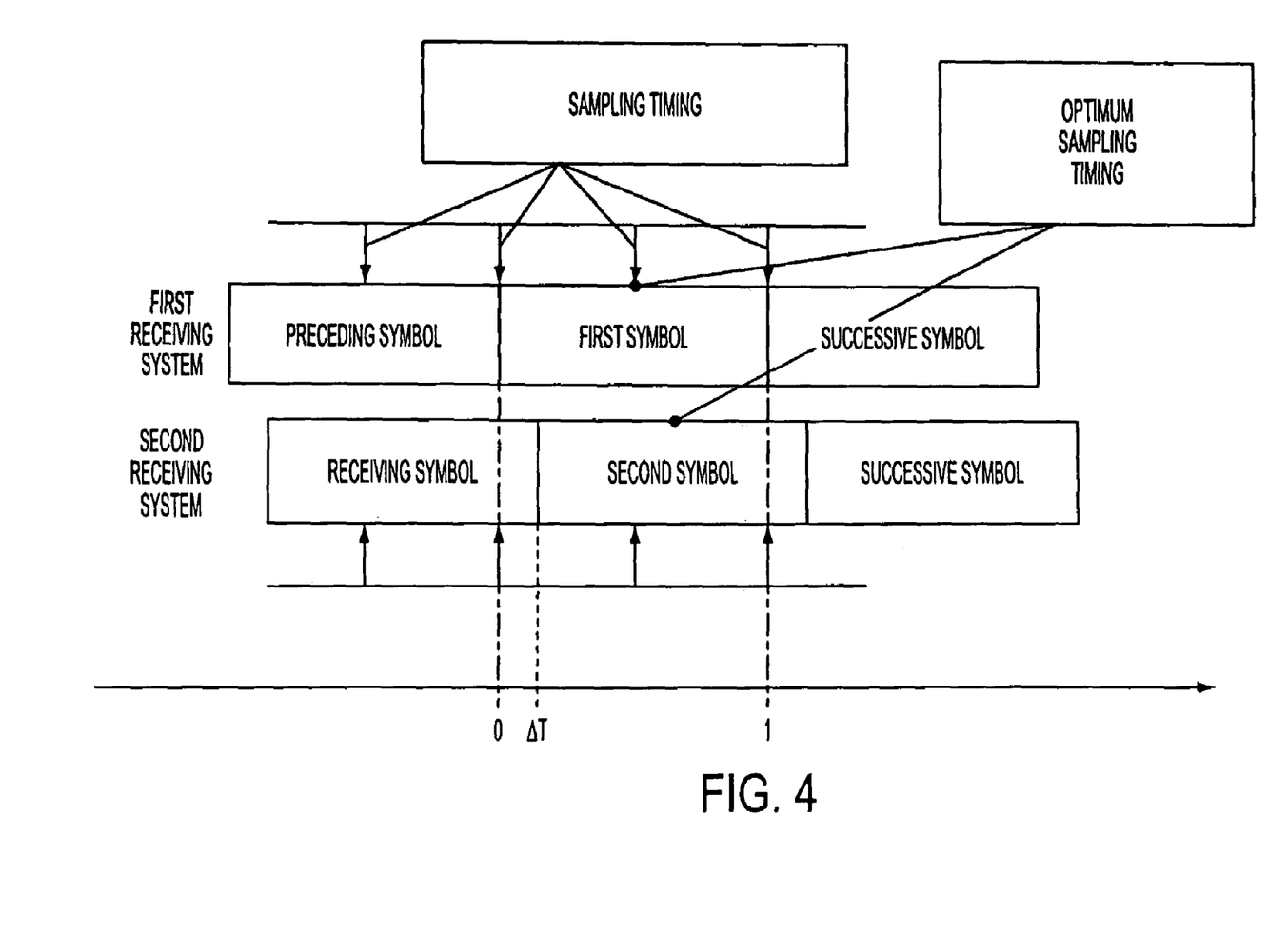
FIG. 4 is a diagram showing the sampling timing.

FIG. 4 is a diagram shows the sampling timing in A/D converters 12, 13.

In FIG. 4 t designates the time axis and the timing of the input of the first symbol to the A/D converter 12 in the first signal receiving system (in this case, signal receiving system from the antenna 8) is defined as t=0. One (1) defines one symbol length and corresponds to the modulation period. Meanwhile, since the second symbol (the first symbol and second symbol each corresponds to the common first transmitting symbol) of the second signal receiving system (in this embodiment, the signal receiving system is connected to antenna 9) is received with a delay as much as the receiving timing difference; depending on the distance between the antennas 8, 9, the receiving timing is delayed by as much as the time indicated by $\Delta T$.

However, the distance between antennas 8, 9 is usually set to 0.3 m or less in many cases. Meanwhile $\Delta T$ can be assumed to be a sufficiently small value, for example, to be zero (0) for the sampling interval because this value is set to the period of 1 ns or less. But, $\Delta T$ is assumed here to exist considering the delay resulting from fluctuation of characteristics of the filter or the like in the radio signal receiving sections 10, 11 and the inputting timing of the received signal to the A/D converter is regarded as the receiving timing. Thereby, $\Delta T$ is defined as a difference between the receiving timing of the first receiving symbol in the first signal receiving system and the receiving timing of the second receiving symbol in the second signal receiving system.

For the radio receiver 18, it is very important to set the sampling timing to the optimum sampling timing (center of the eye pattern indicated with the arrow mark in FIG. 4) for obtaining higher quality of received signal. When the sampling timing is matched with the optimum sampling timing as in the case of the first signal receiving system in FIG. 4, the ideal sampling can be performed. In the second signal receiving system, the sampling timing is deviated as much as $\Delta T$ from the optimum sampling timing but a higher quality of received signal can be realized because the signals of the first and second signal receiving systems are combined in the diversity combining section 16.

Figure 5:
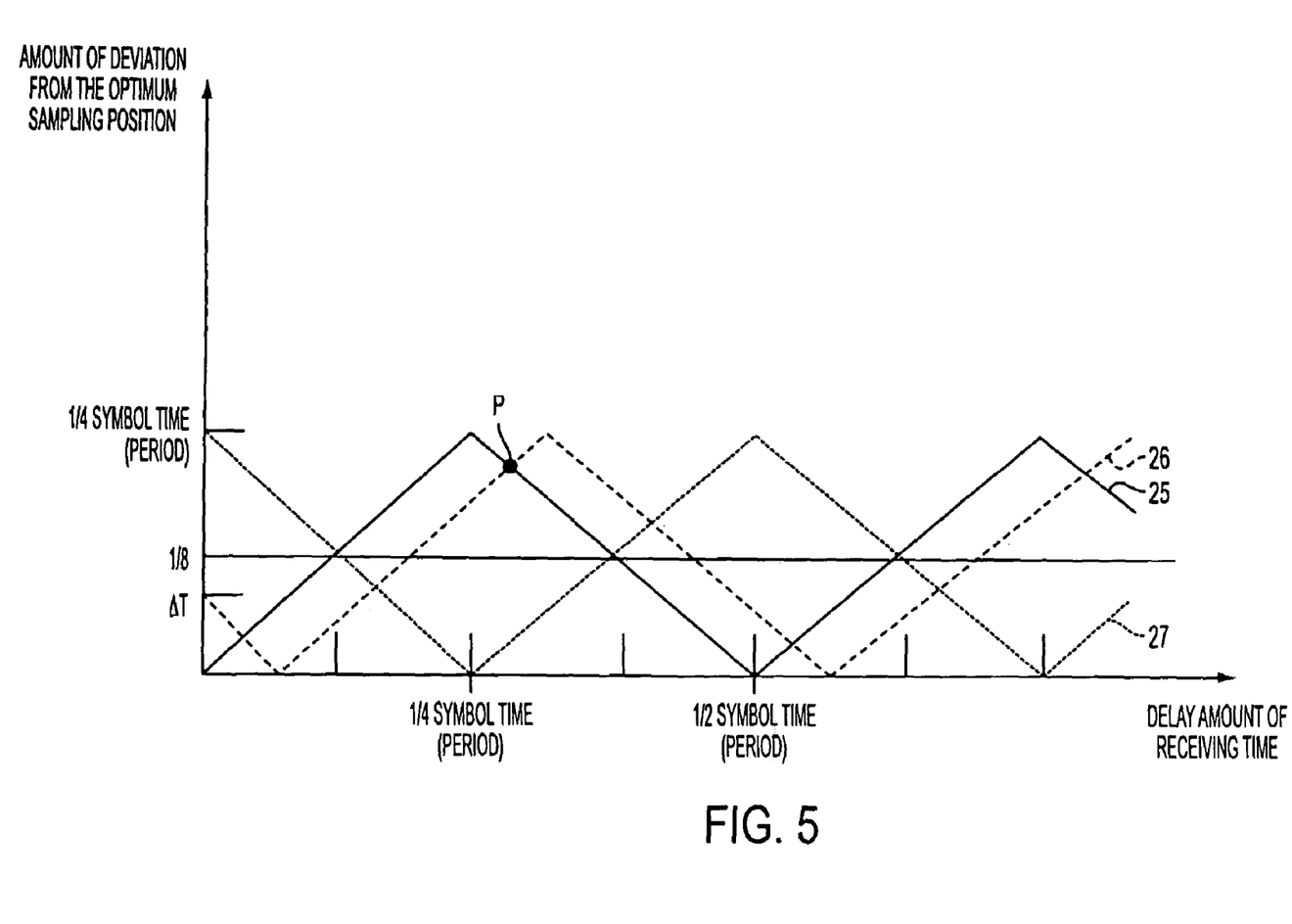
FIG. 5 is a diagram illustrating changes in a deviation amount from the optimum sampling timing when the receiving timing is delayed.

However a problem actually occurs because the receiving timing of the receiving symbol is deviated from the sampling timing. The polygonal line 25 in FIG. 5 indicates the amount of deviation from the optimum sampling position when the receiving symbol of the first signal receiving system is gradually delayed from the condition shown in FIG. 4. As illustrated in FIG. 5, the peak value of deviation from the optimum sampling value indicates the time corresponding to ¼ symbol and this peak value can be attained when the receiving timing is delayed as much as the time corresponding to ¼ symbol.

Meanwhile, the polygonal line 26 of FIG. 5 indicates the amount of deviation from the optimum sampling position when the receiving symbol has been received with a gradual delay for the sampling timing in the second signal receiving system. Deviation of $\Delta T$ from the optimum sampling time is generated when the amount of delay is 0 because of the difference in the receiving timing depending on the distance between the antennas as described previously (difference in the processing time in the radio signal receiving sections 10, 11 can be included).

Here, it is important that at least any receiving system results in the sampling timing near the optimum sampling timing. However, since the first signal receiving system and second signal receiving system respectively show the behaviors illustrated in FIG. 5, even if attention is paid to the smaller value of deviation from the optimum sampling timing regarding a delay time of each receiving timing of the polygonal lines 25, 26 considering that the signal of the first signal receiving system and second signal receiving system are combined in the diversity combining section 16, a large deviation from the optimum sampling timing is generated at the point indicated with the black circle P as illustrated FIG. 5. When the value of $\Delta T$ is smaller, the polygonal lines 25, 26 are closer, allowing that both sampling timings in the first signal receiving system and second signal receiving system are deviated to a large extent from the optimum sampling timing.

(Setting of Initial Delay Amount)

Therefore, in this embodiment, the control section 22 is provided to control, to the value different from $\Delta T$, the difference between the sampling position of the first receiving symbol which is sampled with the A/D converter 12 and the corresponding sampling position of the second receiving symbol which is sampled with the A/D converter 13 by providing the delaying sections 19, 20, setting the amount of delay to at least any delaying section, and relatively deviating the sampling timing respectively in the A/D converters 12, 13.

Namely, the control section 22 sets the initial delay amount to the delaying sections 19, 20 for executing the delaying process for the signals from the common oscillator 20A. For example, it is instructed to add the delay amount 0 to the delaying section 19, while the delay time corresponding to "¼ symbol time (the time equal to a half of the sampling interval)+$\Delta T$" to the delaying section 20.

Accordingly, relative timing relationship between the sampling timing and the second receiving symbol in the A/D converter 13 varies and the characteristic as indicated with the polygonal line 27 of FIG. 5 can be obtained. According to the polygonal line 27, if the first signal receiving system and second signal receiving system are deviated from the sampling timing, a value in the smaller deviation of the delay time of each receiving timing from the optimum sampling timing is kept within the ⅛ symbol time.

Therefore, the quality of the received signal for fluctuation in the receiving timing can be maintained. However, if the difference in the delay amount is set to "¼ symbol time (time equal to a half of the sampling interval)+ΔT", the quality of the received signal in the first signal receiving system and the second signal receiving system is extremely different in a certain timing (when the signal as shown in FIG. 5 is received with a delay corresponding to the ¼ symbol). Therefore, it can also be suggested to improve the diversity gain by reducing a gap of the receiving quality through the setting of the difference in the delay amount to "⅛ symbol time (time equal to a half of the sampling interval)+ΔT".

In above example, the value "¼ symbol time+ΔT" is set for the delaying section 20 but it is more preferable to set, as the other example, the value which is larger than 0 but smaller than one sampling interval because the function which provides a delay larger than that required is never required. In this case, it is recommended not to give the delay of ΔT to the signal receiving side (second signal receiving system) which is different from the receiving (first receiving system) side where the receiving timing is delayed as much as ΔT, because setting of this delay amount will allow an overlap of the characteristic of FIG. 5 for the first signal receiving system and second signal receiving system.

(Change in Preset Delay Amount)

Next, the operation of for changing the predetermined delay amount (for example, ¼ symbol time) set for the delaying section 20 will be described.

The control-section. 22 sets, as described above, the initial delay amount to the delaying section 20. The delaying section 20 gives the delay of the predetermined amount to an output signal from the oscillator 20A depending on the instruction thereof and the A/D converter 13 outputs a digital signal through the sampling in accordance with the delayed timing.

Next, the control section 22 evaluates, for example as the SIR, the quality of the received signal of the second signal receiving system which is delayed in the sampling timing and the received signal of the first signal receiving system which is not delayed in the sampling timing and controls the value being set to the delaying section having lower signal receiving quality to approximate to the value being set to the delaying section having higher signal receiving quality.

With such control described above, delay amount of the delaying section 20 is approximated to zero (to zero itself or to 0+a) when the receiving quality of the, first signal receiving system is higher. When the delay amount is set to zero itself, it is also thought that the signal receiving quality of the second receiving system can also be improved like that of the first signal receiving system. However, the effect that the controlling direction of the delay amount can be determined with the evaluation of SIR can further be obtained by intentionally setting the delay amount of the second signal receiving system to the value which is different by a minute value of a (≠0) from zero.

In the above example, the delay amount has been varied by comparison of the signal receiving quality. However, it is of course possible to add the changing conditions to realize the control for a change when the quality of the system having the higher quality exceeds the reference quality.

When the receiving quality of both signal receiving systems after change in delay amount becomes lower than the reference quality by introducing such reference, the receiving quality can be reset to the initial condition. In the example of the embodiment described above, a delay amount of the delaying section 19 is set to 0 and the delay amount of the delaying section 20 can be reset to the predetermined amount "¼ symbol time+ΔT".

In regard to the value of reference quality, if the radio receiver of this embodiment receives the 16-level QAM signal and the A/D converter performs the over-sampling four times, the SIR becomes 35 dB or higher when the sampling has been performed with the optimum sampling timing (Nyquist point) and becomes 20 dB when the deviation is ¼ clock and 14.4 dB when the deviation is ½ clock. Accordingly, it is also conceivable to set the reference quality to 17.5 dB corresponding to the deviation of 0.35 clock when an external noise does not appear.

Figure 6:
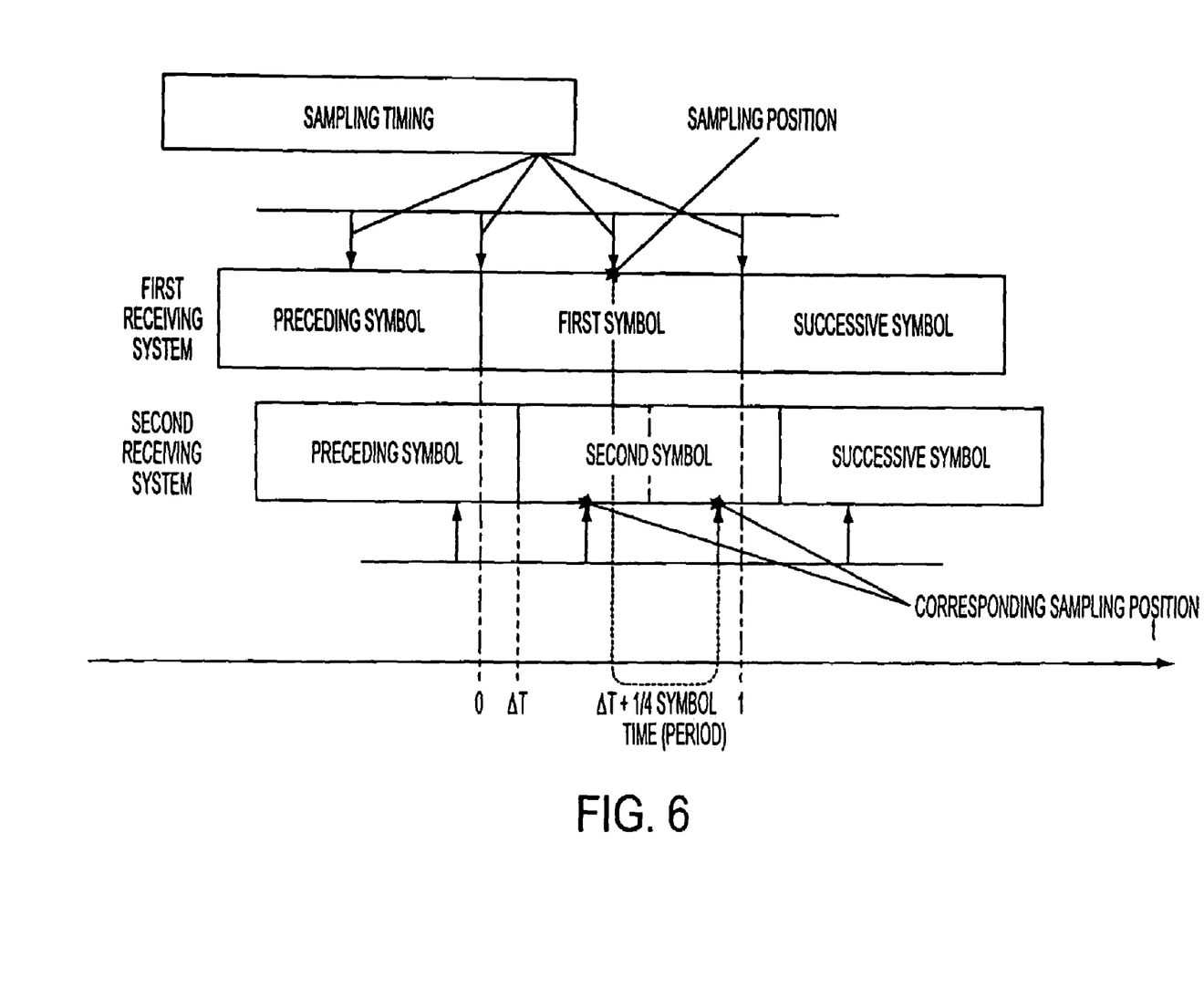
FIG. 6 is a diagram describing the sampling after adjustment of a delay.

FIG. 6 illustrates the sampling timing when the time of ΔT+¼ symbol is set to the delaying section 20. According to the setting of this delay amount, the sampling position (position indicated with the black circle in the left side or the right side in the second signal receiving system) corresponding to the second receiving symbol of the second signal receiving system is deviated as much as ¼ symbol length in the preceding direction for the sampling position in the first receiving symbol of the first signal receiving system and the amount of deviation (difference) including the direction is different from ΔT. When the difference in the delay amount is set to ΔT+n×sampling interval (N is a natural number), it is not desirable because the sampling position is matched with that of the first signal receiving system.

Second Embodiment

Figure 7:
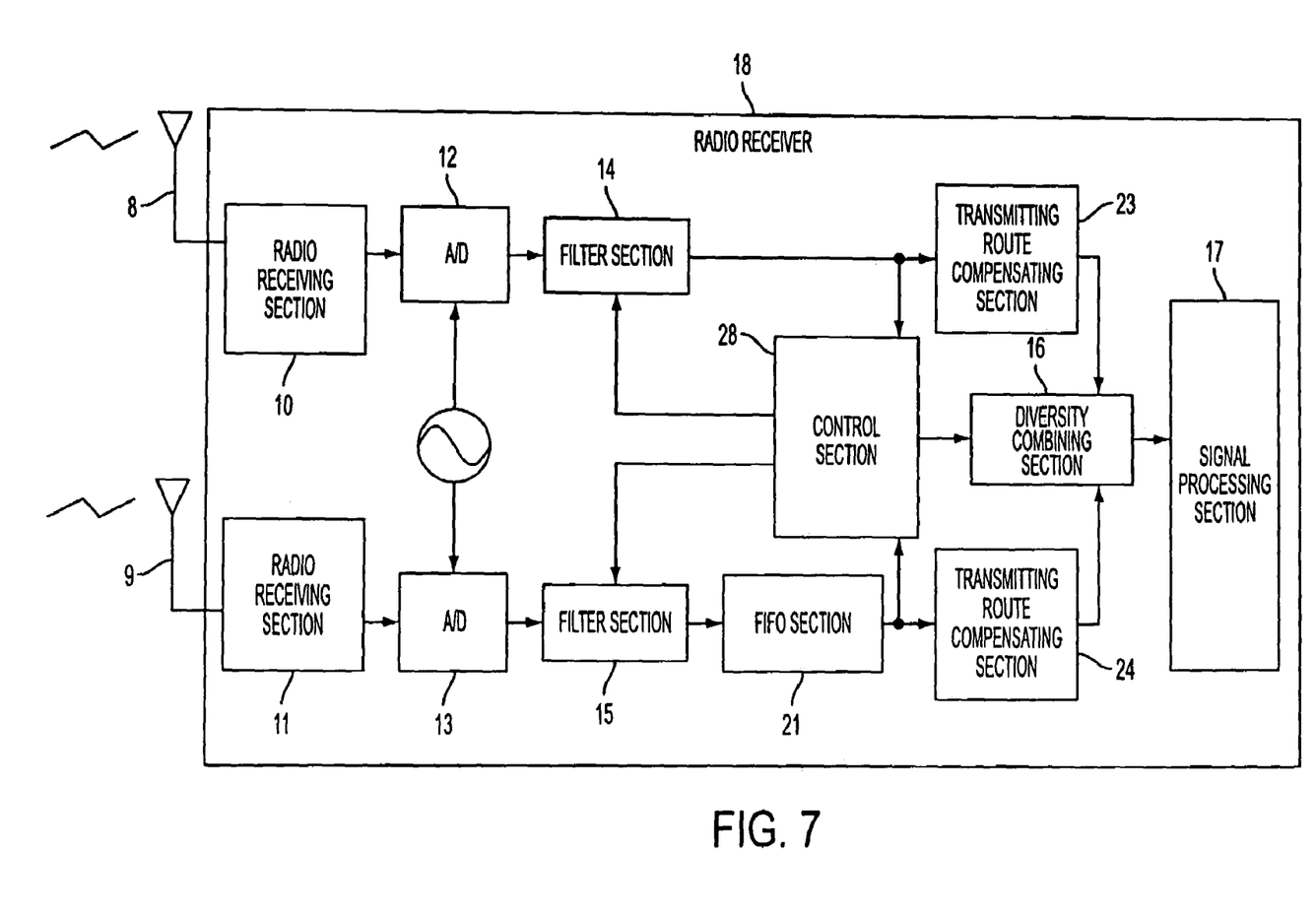
FIG. 7 is a diagram illustrating another embodiment of the radio receiver of the present invention.

In the first embodiment, the A/D converters 12, 13 have been used as the first and second sampling means and the sampling position can be varied in correspondence with a change in the delay amount being set to the delaying section 19 or 20. In the second embodiment, however, a set of the A/D converter 12 and filter section 14 and a set of the A/D converter 13 and filter section 15 have been used respectively as the first sampling means and the second sampling means. In FIG. 7 showing the second embodiment similar elements are designated with reference numerals used in FIG. 3 except the control section. The control section designated at 28 sets the delay amount to the delaying sections 19 and 20, in the second embodiment the control section 28 provides a group of tapping coefficients corresponding to the delay amount to the filter section 14 or 15 as the setting values of the tapping coefficients.

Operations of the radio receiver illustrated in FIG. 7 will be now described. The A/D converters 12, 13 perform the samplings to the input analog signal in the common timing on the basis of an output from the common oscillator 20A. In this case, when a value of ΔT described above is zero, the signal of the same position is sampled for the first receiving symbol and the second receiving symbol, but if the value of ΔT cannot be neglected, the sampling position is deviated as much as ΔT (>0).

However, in the second embodiment, the filter section 14 used as the first sampling means inputs the sampling value obtained from the A/D converter 12 and provides an output by changing the sampling position in accordance with the tapping coefficient preset by the control section 28.

Similarly, the filter section 15 used as the second sampling means inputs the sampling value obtained from the A/D converter 13 and provides an output by changing the sampling position in accordance with the tapping coefficient set by the control section 28.

As described above, a set of the A/D converter 12 and filter section 14 and a set of the A/D converter 13 and filter section 15 perform the sampling in the predetermined sampling interval from the oscillator 20A for the first receiving symbol obtained by receiving the first transmitting symbol transmitted via the first transmission route. On the other hand, a set of the A/D converter 13 and filter section 15 performs the sampling in the predetermined sampling interval from the oscillator 20A for the second receiving symbol obtained by receiving the first transmitting symbol transmitted via the second transmission route.

Moreover, the control section 28 is capable of realizing the control to change the sampling position, with the change in the setting value of the tapping coefficients for the filter sections 14, 15, to make the difference between the sampling position of the first receiving symbol sampled by the set of the A/D converter 12 and filter section 14 and the sampling position of the first receiving symbol sampled by the set of the A/D converter 13 and filter section 15 different from the difference of sampling positions corresponding to the time difference between the receiving timing of the first receiving symbol and the receiving timing of the second receiving symbol.

Figure 8:
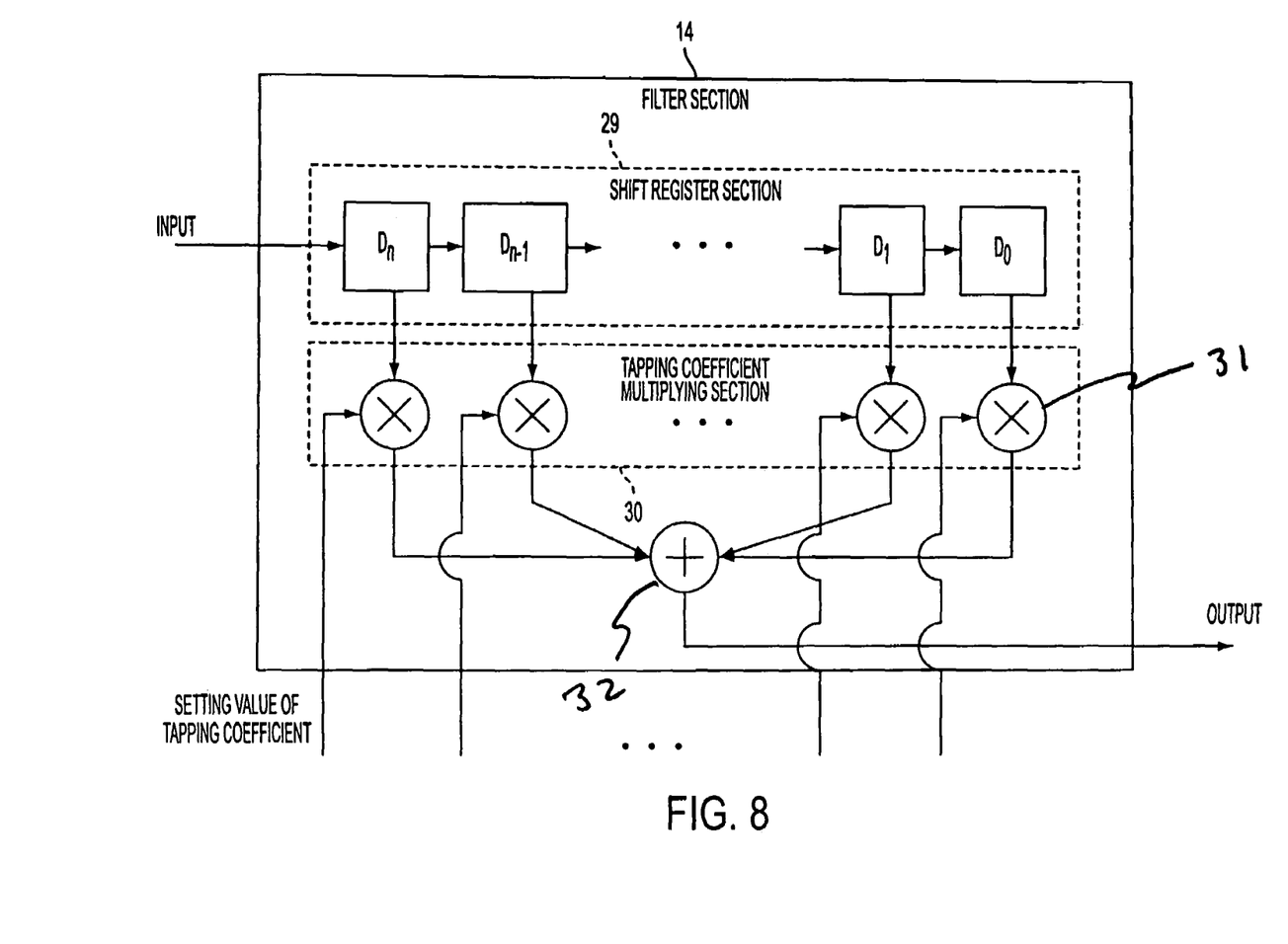
FIG. 8 is a diagram illustrating a configuration of a filter section of the radio receiver of FIG. 7.

Detailed configuration of the filter section 14 (15) is shown in FIG. 8. The filter section 13 (14) includes a shift register section 29 and a tapping coefficient multiplying section 30. Section 30 has a plurality of multipliers 31 and an adder 32. Shift register section includes a plurality of shift registers 27. Multiplication of a value stored in a shift register 27 and a tapping coefficient is performed by sequentially inputting an output from the A/D converter 12(13) to the shift register of the shift resister section 29 and then inputting the setting value of each tapping coefficient to each multiplier of the tapping coefficient multiplying section 30 from the control section 28. A value obtained by multiplying the tapping coefficient is moreover subjected to the arithmetic operation with an exclusive OR section and also provides the result of the arithmetic operation as an output of the filter section 14 (15).

Figure 9:
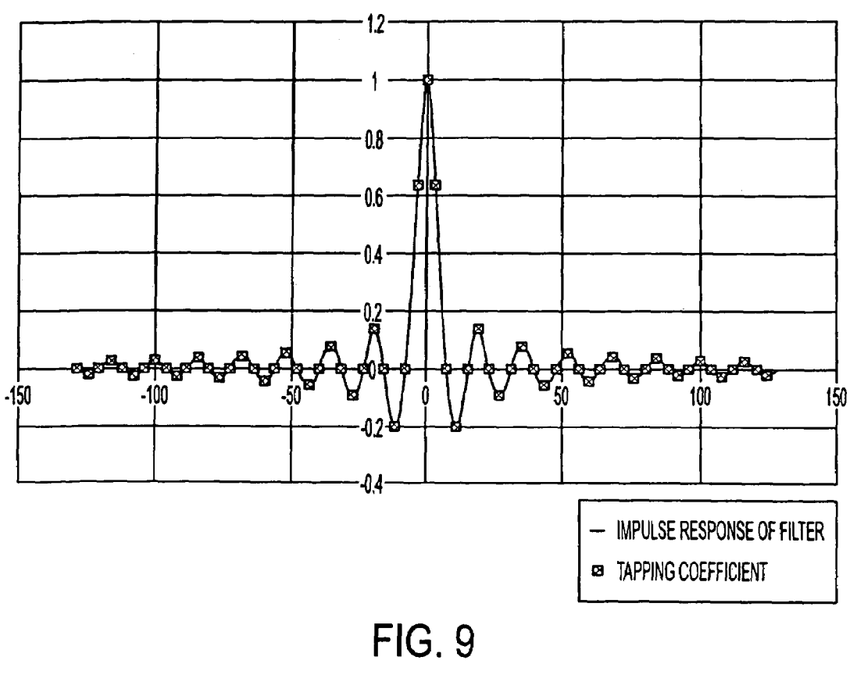
FIG. 9 is a diagram illustrating setting values of tapping coefficients when a delay is zero.

Here, a value given to the filter section 14 or 15 from the control section 28 as the tapping coefficient introduces, when the sampling position is not varied, a value in the vertical axis direction of each point of FIG. 9 as the tapping coefficient. Namely, the value 1 (one) in the vertical axis direction of the point where the value of the horizontal axis is zero is given as the tapping coefficient for a multiplier at the center position of the tapping coefficient multiplying section 30 and each value in the vertical axis direction at the point existing in the right direction of such point is set sequentially to the multipliers in the right side direction of the multiplier at the center position. On the other hand, each value in the vertical axis direction of the point existing in the left side direction of such point is set sequentially to the multipliers in the left side direction of the multiplier at the center position. Accordingly, an output of which the sampling position does not change can be obtained.

Figure 10:
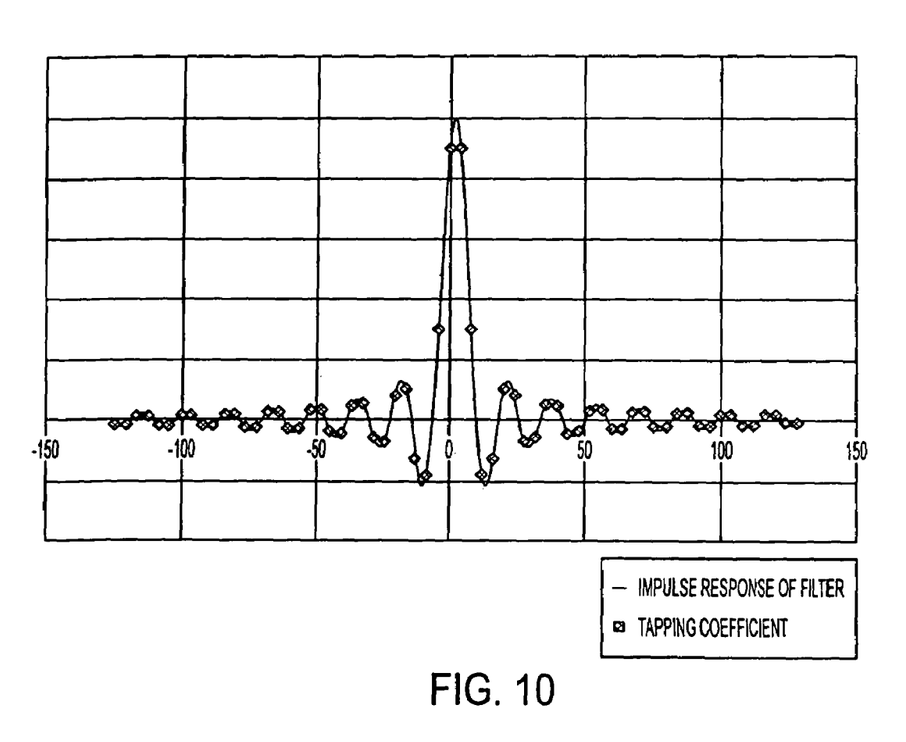
FIG. 10 is a diagram illustrating setting values of tapping coefficients when a positive delay taken place.

Meanwhile, when the sampling position is to be varied (here, the sampling position is delayed), a value in the vertical axis direction of each point on the waveform having the value in the horizontal axis equal to that of each point of FIG. 9 is set as each tapping coefficient on the basis of the impulse response waveform obtained by shifting the impulse response waveform in FIG. 9 in the right side direction as illustrated in FIG. 10 (the scale of the vertical axis is identical to that of FIG. 9). Namely, a value set to the multiplier at the center position is a little smaller than one (1).

As described above, since the sampling positions for the receiving symbols with the first sampling means and second sampling means can be varied with the tapping coefficients given to the filter sections 14, 15, the control section 28 provides to the filter sections 14, 15, a group of the tapping coefficients corresponding to the delay amount to be given to the delaying section described in the first embodiment.

In this case, it is desirable for the control section 28 to provide a memory storing a group of tapping coefficients to be set depending on each delay mount and read the group of tapping coefficients depending on the delay amount from this memory in order to give, when required, the group of tapping coefficients to the filter sections 14, 15.

The second embodiment has been described above and each operation in which the control section 22 of the first embodiment uses the SIR or varies the setting value can also be applied in the same manner to the second embodiment. Namely, it is apparent that each characteristic operation in the first embodiment can also be realized with the constitution of the second embodiment by giving such delay amount to the filter sections 14, 15 in the configuration of FIG. 7 through conversion thereof into the tapping coefficient using the memory described above, in place of the constitution that the control section 22 in the first embodiment sets the delay amount to each delaying section 19, 20.

In the embodiment of FIG. 7, it can further be suggested that each delaying section described in the first embodiment be inserted and the delay amount to be given to each control section can be controlled with the control section 28 when an output from the oscillator 20A is inputted to the A/D converters 12, 13.

In such a case, it is desirable to realize the delay amount with addition of the amount to be delayed with the setting of the delaying section and the amount to be delayed with the setting of the tapping coefficient in the filter section.

For example, for the delay of "¼ symbol period+ΔT", delay of the ¼ symbol period is set to one delaying section as the delay amount and for the delay of ΔT, it is realized with the setting value of the tapping coefficient for the filter section. When a change in the delay amount (for example, −B) is required, it is enough to change the tapping coefficient depending on the required amount of change (here, it is ΔT−B).

Finally, it is also possible to propose another method to realize a delay of the ¼ sampling timing period in the preceding stage of the A/D converter (particularly, the radio signal receiving section 11).

Finally, the effects obtained by the present invention will be briefly described below.

According to the present invention, since the difference between the sampling position of the first receiving symbol by the first sampling means and the sampling position of the second receiving symbol by the second sampling means can be set as the difference which is different from the difference in position depending on the difference in receiving timings of the first and second receiving symbols, if the receiving timing is varied, at least any sampling timing can be approximated to the ideal sampling timing and thereby quality of the received signal of the radio receiver can be improved.

Moreover, according to the present invention, the difference in the sampling positions can be given to the radio receiver for diversity reception depending on the specified amount of timing difference unlike the prior art in which the difference between the sampling position of the first receiving symbol with the first sampling means and the sampling position of the second receiving symbol with the second sampling means is restricted depending on the difference corresponding to the receiving timing due to each antenna depending on the interval of antennas for diversity reception. Accordingly, substantial deviation of the sampling timing of both systems from the ideal sampling timing can be prevented; at least any sampling timing can therefore be approximated to the ideal sampling timing, and quality of the received signal of the radio receiver for diversity reception can also be improved.

Moreover, according to the present invention, since the specified amount is larger than zero (0) and is equal to or smaller than a half of the sampling timing, it is sufficient even if the function for adjusting the timing in the amount larger than the required amount is not provided.

Moreover, according to the present invention, since the specified amount, which is set to approximate the sampling timing of the other sampling means to the sampling timing of the sampling means corresponding to the receiving system of the system having higher quality, is changed after the specified amount is once set, further optimum sampling timing of both systems can be set when the specified amount is set. Accordingly, more effective diversity reception can be realized.

What is claimed is:

1. A radio receiver, comprising:
    a first sampling section for sampling, in the predetermined sampling interval, a first receiving symbol obtained by receiving a first transmitting symbol transmitted via a first transmission route;
    a second sampling section for sampling, in the sampling interval similar to said predetermined sampling interval, a second receiving symbol obtained by receiving said first transmitting symbol transmitted via a second transmission route;
    a diversity combining section for diversity combining sampling signals obtained by said first sampling section and second sampling section respectively; and
    a control section for controlling a sampling position to obtain a difference between a sampling position of said first receiving symbol which is sampled by said first sampling section and the corresponding sampling position of said second receiving symbol which is sampled by said second sampling section, said difference being different from a difference in sampling positions corresponding to the difference in time between a receiving timing of said first receiving symbol and a receiving timing of said second receiving symbol.

2. A radio receiver according to claim 1, further comprising two transmission route sections of which one is connected to said first sampling section and another is connected to said second sampling section, said transmission route sections executing a phase rotation process of received signals from said first and second sampling sections, respectively, to compensate for phase rotation of the signals received from said first transmission route and said second transmission route, respectively.

3. A radio receiver according to claim 2, further comprising a signal processing section, wherein said diversity combing section is connected to each of said transmission route sections to combine sampling signals after compensation by said first and second transmission route sections to apply a combined signal to said signal processing section.

4. A radio receiver for diversity reception of signals of two signal receiving systems, said signals being received with two antennas, via a first transmission route and a second transmission route, respectively the radio receiver comprising:
    a first sampling section for sampling a received signal of a first signal receiving system;
    a second sampling section for sampling a received signal of a second signal receiving system;
    a diversity combining section for diversity combining signals sampled by said first sampling section and said second sampling section;
    a timing generating section for generating a sampling timing; and
    a timing control section for controlling at least one of a first sampling timing for said first sampling section and a second sampling timing for said second sampling section to cause a specified amount of deviation between said first sampling timing and said second sampling timing.

5. The radio receiver according to claim 4, wherein said specified amount of deviation is larger than zero (0) but equal to or smaller than a half of the interval of sampling timing.

6. The radio receiver according to claim 4, further comprising:
    a setting control section for presetting said specified amount of deviation of said sampling timing to a certain value which is equal to or smaller than a half of the sampling interval and changing a preset specified amount preset by said control section setting to approximate the sampling timing of the other sampling section to the sampling timing of the sampling section corresponding to the signal receiving system at a high quality side on the basis of the quality of the received signal of the first signal receiving system after the sampling by said first sampling section after said presetting and the quality of the received signal of the second signal receiving system after the sampling by said second sampling section.

7. The radio receiver according to claim 4, further comprising an evaluating section evaluating the quality of the received signal of the first signal receiving system after the sampling by said first sampling section and the quality of the received signal of the second signal receiving system after the sampling by said second sampling section, wherein a selected signal is applied to said selecting and combining section from said evaluating section to select the signal of the signal receiving system having a higher receiving quality as evaluated by said evaluating section.

8. A radio receiver according to claim 4, further comprising two transmission route sections of which one is route sections of which one is connected to said first sampling section and another is connected to said second sampling section, said transmission route sections executing a phase rotation process of received signals from said first and second sampling sections, respectively, to compensate for phase rotation of the signals received from said first transmission route and said second transmission route, respectively.

9. A radio receiver according to claim 8, further comprising a signal processing section, wherein said diversity combing section is connected to each of said transmission route sections to combine sampled signals after compensation by said first and second transmission route sections to apply a combined signal to said signal processing section.

* * * * *